United States Patent Office 3,531,651
Patented Sept. 29, 1970

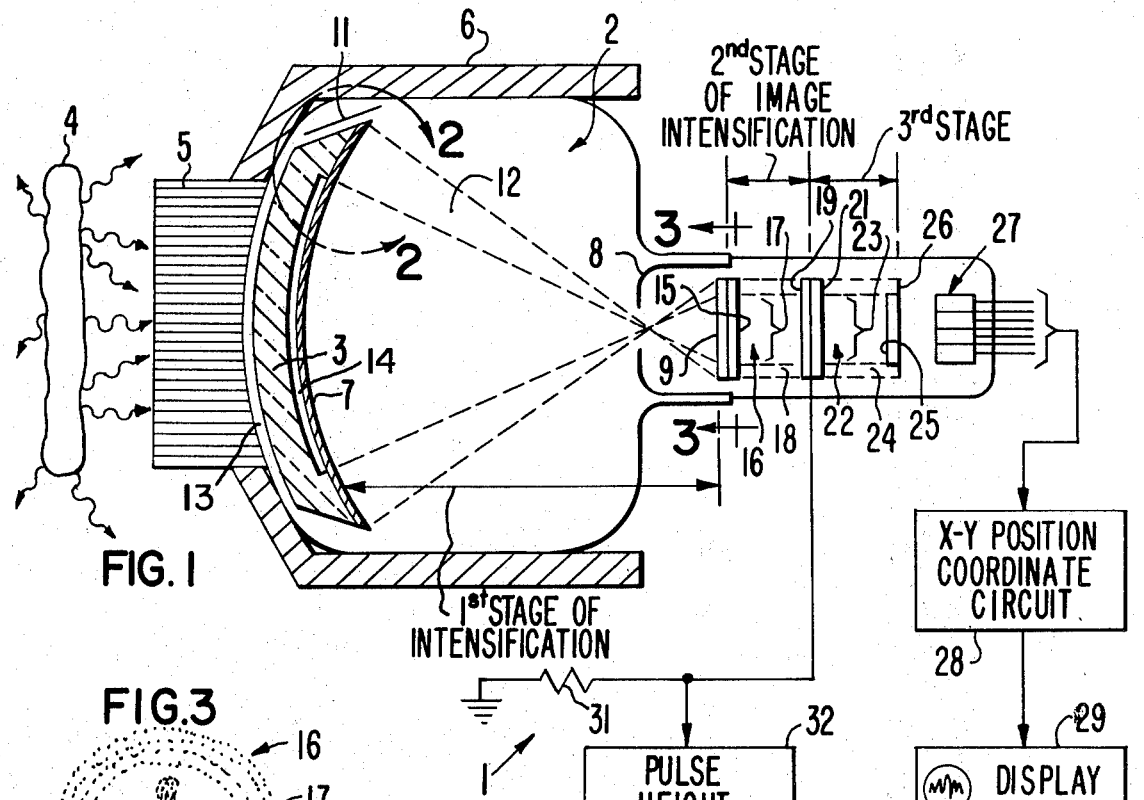
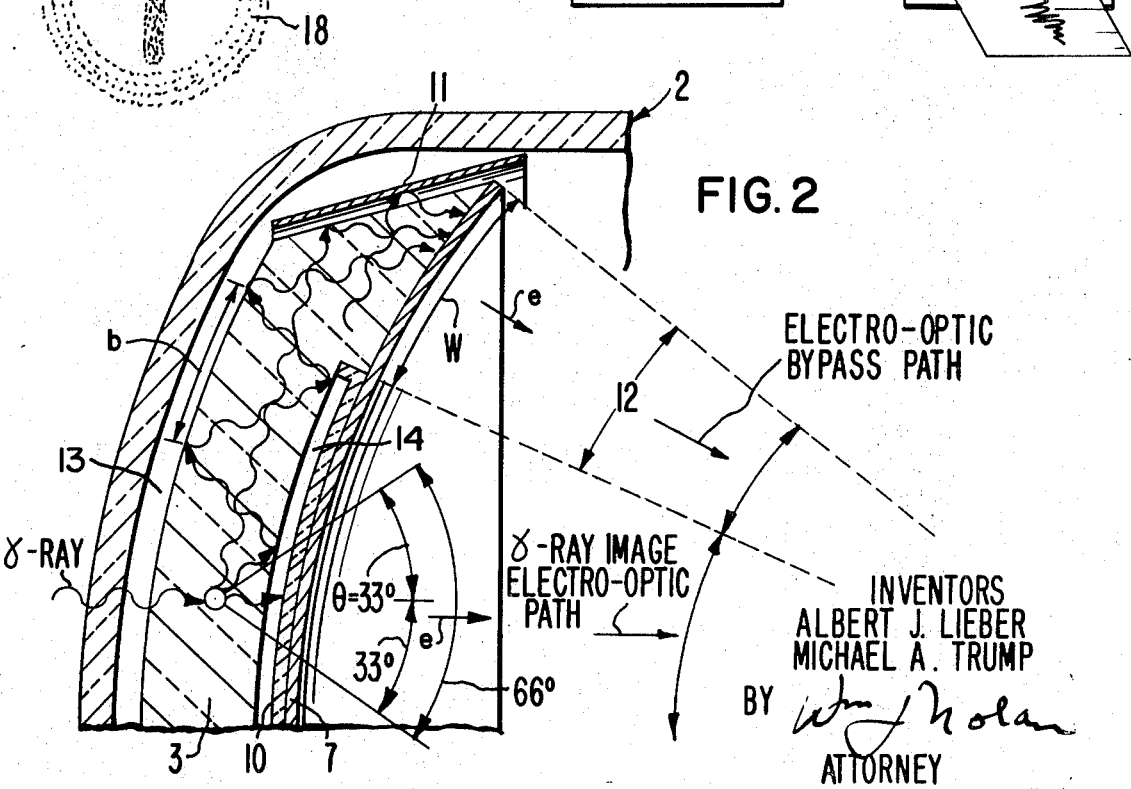

3,531,651
GAMMA-RAY CAMERA EMPLOYING AN ELECTRO-OPTIC BYPASS FOR ENERGY SELECTION
Albert J. Lieber and Michael A. Trump, Palo Alto, Calif., assignors to Varian Associates, Palo Alto, Calif., a corporation of California
Filed Dec. 21, 1967, Ser. No. 692,380
Int. Cl. G01t 1/20
U.S. Cl. 250—71.5                                   10 Claims

ABSTRACT OF THE DISCLOSURE

A gamma-ray camera is disclosed. The camera includes a gamma-ray image intensifier tube which views a source of gamma rays such as a tumor doped with a radioactive material, such as technetium 99 having a relatively short half-life of six hours and emitting primary gamma rays of approximately 140 kev. energy. A multi-bore lead collimator is disposed between the source of gamma rays and the image intensifier tube for collimating the emitted gamma radiation into the γ-ray pickup crystal made of a relatively thick curved slab of gamma-ray scintillating material, such as an alkali metal halide. The pickup crystal converts the collimated gamma-ray image into an optical image which excites a photo-cathode of the image intensifier tube to produce a stream of electrons having an electron image carried therein corresponding to the original gamma-ray image. The electron image is then accelerated to relatively high velocity and focused onto a fluorescent screen to produce an intensified optical image of the gamma-ray image under observation. Additional stages of electro-optical amplification are employed for further intensifying the optical image. An X–Y position co-ordinating device, such as an array of photo tubes, views the intensified optical image to convert the image into an electrical output which is employed for producing a display corresponding to the original γ-ray image on a recording medium, such as an oscilloscope or photographic film. A relatively large fraction of the liberated optical photons produced in the scintillation process are trapped within the slab of scintillating material and are light-piped to the outer periphery of the curved slab. These trapped photons are picked up at the periphery of the slab and converted into an annular stream of electrons which are accelerated and focused upon the fluorescent screen in a region around the outer periphery of the γ-ray image, which is also intensified in the central region of the fluorescent screen. The electron current of the intensified γ-ray image and the electron current represented by the bypassed optical photons are summed and the sum is employed in a pulse-height analyzer for discriminating the energy of scintillating events. The output of the pulse-height analyzer is employed in the display, such that only those events falling within a predetermined relatively narrow energy range corresponding to a primary gamma-ray radiation are displayed. In this manner, undesired background due to Compton scattering and the like is eliminated from the display thereby producing relatively high resolution in the display.

DESCRIPTION OF THE PRIOR ART

Heretofore, a number of different types of radioisotope cameras have been constructed which include a gamma-ray or X-ray pickup crystal made of a scintillating material which is arranged to view the radioactive source, such as a radioisotope-doped deep-seated tumor, through a multi-channel collimator. Such radioisotope cameras are described in the text titled Instrumentation in Nuclear Medicine, ed. by G. J. Hine, published by the Academic Press, New York, 1967, at pp. 486–552. Such radioisotope cameras have included means for intensifying the optical image produced by the scintillation of the original X-ray image and means for observing the intensified optical image to derive electrical signals for co-ordinating the positions of the scintillating events to produce a display of the X-ray or gamma-ray image emitted by the object under analysis. Some of such devices have also included a pulse-height analysis circuit for discriminating against scintillating events caused by X-rays or gamma rays falling outside of a predetermined energy range. The output of the pulse-height analyzer has been fed to the display for discriminating against background gamma-ray emissions from the sample under observation to improve the resolution of the display.

However, one of the problems with the prior art radioisotope cameras has been that a relatively large fraction of photons liberated in the scintillator are trapped by internal reflection within the scintillator slab and are either lost to the image intensifier tube or are reflected back through the image-converting portion of the scintillator to appear as unwanted background. When the internally reflected photons are lost to the image intensifier tube, the total number of optical photons which are converted into the electron image for intensification and pulse-height analysis constitute only a small fraction of the total number of photons generated in the scintillator, thus, the signal-to-noise ratio of the pulse-height analysis channel is relatively low. Alternatively, when the internally reflected photons are reflected back through the image-converting portion of the image intensifier tube, these reflected optical photons contribute substantially to the background, thereby greatly reducing the signal-to-noise ratio and the ultimate resolution that can be obtained by the radioisotope camera.

SUMMARY OF THE PRESENT INVENTION

The principal object of the present invention is the provision of an improved gamma or X-ray camera.

One feature of the present invention is the provision, in an X-ray or gamma-ray image intensifier, of light-piping the internally reflected optical photons within the scintillator crystal to a region near the outer perimeter of the crystal, where they are converted into an electron current separate from the electron current representing the gamma-ray image to be intensified. The bypassed optical photons are then intensified in a region separate from the optical photons representing the gamma-ray image, such that they do not present an unwanted background signal in the gamma-ray image signal being intensified.

Another feature of the present invention is the same as the preceding feature wherein the intensified X-ray image signal and the intensified bypassed photon signals are summed to obtain an output for pulse-height analysis and energy selection for removing unwanted background from the display of the gamma-ray image being recorded.

Another feature of the present invention is the same as any one or more of the preceding features wherein voids are provided at opposite faces of the gamma or X-ray scintillating crystal to facilitate light-piping of of internally reflected photons to the perimeter of the crystal.

Another feature of the present invention is the same as the preceding feature wherein a photo-cathode emitter is formed directly on the scintillating crystal at its outer periphery for converting the bypassed photons into an annular stream of electrons surrounding the stream of electrons containing the gamma-ray image to be intensified.

Another feature of the present invention is the same as the preceding feature wherein both the image-bearing electron stream and its surrounding annular photon bypass electron stream are directed onto a fluorescent screen backed by a photo-emitting layer for further intensification and wherein the total current flowing to the photo-emitter is sampled for pulse-height analysis and energy selection.

Other features and advantages of the present invention will become aparent upon a perusal of the following specification taken in connection with the accompanying drawings wherein:

BRIEF DESCRIPTION OF THE DRAWINGS

FIG. 1 is a schematic longitudinal sectional view, partly in block diagram form, of a radioisotope camera incorporating features of the present invention, FIG. 2 is an enlarged sectional view of a portion of the structure of FIG. 1 delineated by line 2—2, and FIG. 3 is an enlarged sectional view of a portion of the structure of FIG. 1 taken along line 3—3 in the direction of the arrows.

DESCRIPTION OF THE PREFERRED EMBODIMENTS

Referring now to FIG. 1, there is shown a radioisotope camera 1 incorporating features of the present invention. The radioisotope camera 1 includes an X-ray or $\gamma$-ray image intensifier tube 2 of the general type described in an article entitled, "X-Ray Image Intensification With a Large Diameter Image Intensifier Tube," appearing in the American Journal of Roentgenology, Radium-Therapy and Nuclear Medicine, vol. 85, pp. 323–341 of February, 1961. The image intensifier tube 2 is evacuated to $10^{-7}$ torr and includes a pickup crystal 3 disposed to receive X-ray or $\gamma$-rays radiated from a radioisotope doped object 4, such as a deep-seated tumor or organ, doped with a suitable radioactive material, such as technetium 99 which has a relatively short half-life of six hours and wherein 90% of the radioactive decay comprises gamma rays of approximately 140 kev. energy. The gamma-ray radiation emanating from the object 4 leaves the object 4 in an isotropic pattern. Therefore, a multi-channeled lead collimator structure 5 is disposed between the object 4 and the pickup crystal 3 for collimating the emitted gamma-ray radiation falling upon the crystal 3. The collimator 5 includes a hollow cylindrical skirt portion 6 surrounding the intensifier tube 2 for shielding the tube from the gamma-ray radiation.

The pickup crystal 3 is preferably formed by a spherically curved slab of an alkali metal halide material, such as cesium iodide activated with sodium to form a scintillator. The collimated gamma-ray image which passes through a face plate portion of the tube's envelope and falls upon the scintillator crystal 3 produces photons of optical radiation within the scintillator 3. The scintillating slab 3 is made relatively thick, as of 0.060″ to 1.0″ thick, such that substantially all of the gamma-ray radiation falling on the scintillator crystal is converted into optical photons. The optical photons, produced in the scintillation process, are emitted isotropically from the scintillating event (see FIG. 2). A certain fraction of the emitted photons are emitted within a forward cone having an half-solid angle defined by the critical ray angle $\theta$ for the material making up the scintillator crystal 3. In the case of cesium iodide, having an index of refraction of approximately 1.8, the critical ray angle is approximately 33° when voids are provided at opposite faces of the crystal 3, such voids having an index of refraction of 1. Thus, optical photons emitted within the critical angle $\theta$ and emitted in the forward direction pass out of the scintillator crystal 3 to a photo-cathode emitter layer 7 formed on an optically transparent membrane 10 as of glass to produce an electron image corresponding to the original gamma-ray image. The electron image is accelerated to relatively high beam voltage, as of 30 kv., by means of conventional focusing electrodes, not shown, disposed within the tube 2. The high velocity electron image is then focused through an anode 8 onto a fluorescent screen 9 for converting the electron image into an intensified optical image on the screen 9.

A preponderance of the optical photons liberated by the scintillating event within the crystal 3 are not contained within the forward and backward cone angles of 66° and therefore these photons are internally reflected at the faces of the crystal 3 and propagate toward the outer perimeter of the crystal 3 due to a light-piping effect. Thus, approximately 8% of the liberated photons pass out of the crystal 3 in the forward direction and contribute to a useful electron image, approximately 8% of the liberated photons are back-scattered in a similar-shaped cone and pass out of the crystal 3 to be lost from the system. A remaining 84% of the liberated photons are light-piped by internal reflection within the crystal 3 to its outer perimeter. At the outer perimeter of the crystal 3, the photo-cathode 7 is formed directly on the inside concave surface of the crystal 3. The photo-cathode material has an index of refraction of approximately 2.2 and when it is formed directly on the crystal 3 it facilitates the escape of the photons from the crystal into the back of the photo-cathode layer 7. The radial width $w$ of the annular portion of the crystal 3 which is coated with photo-cathode emitter 7 is greater than the skip distance $b$ for a reflected critical ray within the crystal 3. In addition, the peripheral edge of the crystal 3 is cut at an angle approximately parallel to the critical ray angle to reflect light rays into the photo-cathode 7. A light reflector 11 is separated from the crystal 3 by a void to reflect escaping rays back to the crystal 3 and thence to the photo-cathode 7. Thus, approximately 84% of the liberated photons are light-piped to the periphery of the crystal 3 wherein they are converted into an annular stream of electrons 12 which surrounds the stream of electrons containing the gamma-ray image.

The outside annular stream of electrons 12 is also accelerated to relatively high beam velocity and focused through the anode 8 onto the outer perimeter of the fluorescent screen 9 (see FIG. 1). At the screen 9, the outer stream of electrons 12 produces an optical output corresponding in amplitude to the number of optical photons which have been bypassed around the $\gamma$-ray image electro-optical path by means of the optical bypass which comprises the light piping optical bypass path within the scintillator slab 3, and the separate annular path 12 for electrons from the perimeter of the slab 3 to the outer perimeter of the fluorescent screen 9.

A photo-cathode emitter layer is formed on the back side of the fluorescent screen 9 for converting the optical image on the screen 9 into an electron stream 16 (see FIG. 3) having an inner cylindrical region 17 corresponding to the X-ray or gama-ray image and an outside annular stream portion 18 corresponding to the output of the optical bypass. The electron stream 16 is accelerated to relatively high voltage and focused on a second fluorescent screen 19 (see FIG. 2) for producing a second stage of optical image intensification. A photo-cathode emitter layer 21 is formed on the back side of the fluorescent screen 19 for converting the intensified optical image falling upon the screen 19 into another stream of electrons 22 having an inner cylindrical core 23 corresponding to the gamma-ray image and an outer annular stream portion 24 corresponding to the bypassed photons. The electron stream 22 is accelerated to relatively high voltage and focused upon a third fluorescent screen 25 for producing a third stage of image intensification. The diameter of the fluorescent screen 25 is confined to the diameter of the inner core of electrons 23 containing the intensified gamma-ray image. An annular collector electrode 26 surrounds the screen 25 for collecting the outer stream of electrons 24 corresponding to the bypassed photons. The gain for each of the three stages of electron intensification is about 40 per stage.

An array of photo-detector tubes 27 are disposed over the image on the fluorescent screen 25 for observing the screen and determining the X–Y position of scintillating events occurring in the intensified optical image corresponding to a reproduction of the original γ-ray image. The electrical outputs from the array of phototubes 27 are fed to an X–Y position co-ordinating circuit 28 which computes the location of the scintillations within the screen 25. The position information is fed to a display 29 to give an image readout of the original γ-ray image to be recorded. A suitable optical readout circuit, including the phototubes 27, X–Y position co-ordinating circuit 28 and display 29, is described in the aforecited text at pp. 496–500.

The electron current drawn by the photo-cathode emitter 21 in the third stage of electro-optical amplification constitutes a summation of the current due to the γ-ray image and due to the bypassed photons. A resistor 31 is placed in series with the electrical current drawn by the photo-emitter 21 to give an electrical output signal corresponding to the summation current, which is then fed to a pulse-height analyzer 32. The pulse-height analyzer 32 includes an energy discriminator which discriminates against scintillating events caused by scintillation of gamma rays less than a predetermined amplitude. The energy window of the pulse-height analyzer 32 not only discriminates against most scattered gamma rays and many due to natural background, since they do not meet the pulse-height energy requirement of the window, but also discriminates against pulse-heights greater than the window which could be caused by gas bursts or high field emission within the intensifier tube 2. The output of the pulse-height analyzer 32 is fed to control the recording in the display 29 such that only those scintillating events falling within the predetermined energy window corresponding to primary gamma rays are recorded on the display. A suitable pulse-height analyzer circuit 32 is described in the aforecited text at pp. 496–500.

An advantage of the radioisotope camera of FIG. 1 as compared to those cameras of the prior art is that a relatively high signal-to-noise ratio for pulse-height analysis and energy selection is available while maintaining a relatively high signal-to-noise ratio for the gamma-ray image throughout the camera system. In other words, the optical bypass permits a relatively large percentage of all of the photons produced by the scintillating screen 3 to be utilized for pulse-height analysis while preventing the bypassed photons from contributing to unwanted background in the gamma-ray image being amplified and recorded. The provision of the electro-optical bypass greatly improves the signal-to-noise and resolution of the recorded display.

Although the radioisotope camera 1 of the present invention been described as employed for recording γ-ray images or X-ray images, the provision of the optical bypass is applicable in general to image intensifier systems employing a scintillator which scintillates by absorption of nuclear radiation. Such nuclear radaition includes but is not limited to γ-rays, X-rays, β-rays, protons, and α-particles.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In an image intensifier apparatus means forming a nuclear radiation image pickup crystal, said crystal being made of nuclear radiation sensitive scintillator material which scintillates in response to a nuclear radiation image falling upon the crystal by absorbing the rays of nuclear radiation and converting same into photons of light to produce a corresponding optical image, means for defining a first electro-optical path and for intensifying the optical image, said pickup crystal of scintillator material having a finite thickness such that a certain fraction of the photons produced in the crystal are internally reflected at the opposite faces of the crystal such that these photons travel inside said crystal to the perimeter thereof, the improvement comprising, optical bypass means for defining a second electro-optical path substantially separate from said first electro-optical path and for picking up and intensifying the internally reflected photons in said second electro-optical path which is separate from and which bypasses said first electro-optical path employed for intensification of the optical image within the image intensifier apparatus.

2. The apparatus of claim 1 including, means for summing the intensified optical image output and the intensified bypassed optical photon output to derive an output representative of the energy of the incident nuclear radiation.

3. The apparatus of claim 1 wherein said means for intensifying the optical image includes, means for picking up the optical image and converting same into a stream of electrons carrying an electron image, and wherein said optical bypass means includes means at the perimeter of said nuclear radiation pickup crystal for picking up the internally reflected photons and for converting same into an annular stream of electrons surrounding the electron stream containing the electron image.

4. The apparatus of claim 1 wherein said pickup crystal comprises a slab of scintillating material disposed facing the source of nuclear radiation on one side and facing said optical image intensifier means on the other side, means forming a pair of voids disposed adjacent opposite faces of said slab of scintillating material to cause said slab of scintillating material to form an efficient light-pipe for transmitting internally reflected photons to the perimeter of said slab of scintillating material.

5. The apparatus of claim 4 wherein said slab of scintillating material is curved in the shape of a spherical section with the concave face of said slab disposed facing said optical image intensifier means, and wherein an annular region of said concave face of said slab near the outer perimeter of said slab is coated with a photo-cathode material to form a photo-emitter for converting the bypassed photons into an annular stream of electrons, means for accelerating the annular stream of electrons to relatively high velocity, and means forming a fluorescent screen for intercepting the annular stream of electrons and converting same into an intensified optical output.

6. The apparatus of claim 5 wherein the perimeter of said spherical slab section is outwardly flared from its outer radius to its inner radius such that its concave face is larger in area than its outer convex face to facilitate reflection of the internally trapped photons out of the slab into the back of said photo-cathode coating disposed on said slab near its perimeter.

7. The apparatus of claim 3 including, means forming a fluorescent screen for intercepting the nuclear radiation image-bearing electron stream and its surrounding bypassed electron stream for converting both streams into intensified optical outputs, means forming a second stage of light amplification for intensifying both the optical image and the optical bypass signal in separate regions of space.

8. The apparatus of claim 7 wherein said second stage of light amplification includes a photo-cathode for converting the intensified optical image and the intensified bypass optical output into a stream of electrons, and means for summing the photo-emission current resulting from both of said converted and intensified optical images to obtain an electrical output representative of the energy of the photons of nuclear radiation falling upon said pickup crystal.

9. The apparatus of claim 8 including means for monitoring the intensified image corresponding to the original nuclear radiation image and for deriving electrical signals representative of the co-ordinates of scintillations in said pickup crystal.

10. The apparatus of claim 9 including means for analyzing the pulse-height of the electrical output representative of the energy of the photons of nuclear radiation falling upon said pickup crystal to produce an output corresponding to the photons of nuclear radiation falling within a certain preselected relatively narrow energy band, and means responsive to the co-ordinate electrical signals and to the output of said pulse-height analyzer to produce a display of the nuclear radiation image.

References Cited

UNITED STATES PATENTS

| | | | |
|---|---|---|---|
| 2,853,620 | 9/1958 | Fox et al. | 250—71.5 |
| 3,017,517 | 1/1962 | Niklas | 250—213 |
| 3,127,512 | 3/1964 | Monaghan | 250—71.5 |

RALPH G. NILSON, Primary Examiner

D. L. WILLIS, Assistant Examiner

U.S. Cl. X.R.

250—83.3, 213